US011302300B2

(12) United States Patent
Rossenbach et al.

(10) Patent No.: US 11,302,300 B2
(45) Date of Patent: Apr. 12, 2022

(54) METHOD AND APPARATUS FOR FORCED DURATION IN NEURAL SPEECH SYNTHESIS

(71) Applicant: Applications Technology (AppTek), LLC, McLean, VA (US)

(72) Inventors: Nick Rossenbach, Aachen (DE); Mudar Yaghi, McLean, VA (US)

(73) Assignee: Applications Technology (AppTek), LLC, McLean, VA (US)

( * ) Notice: Subject to any disclaimer, the term of this patent is extended or adjusted under 35 U.S.C. 154(b) by 0 days.

(21) Appl. No.: 16/953,114

(22) Filed: Nov. 19, 2020

(65) Prior Publication Data

US 2021/0151028 A1    May 20, 2021

Related U.S. Application Data

(60) Provisional application No. 62/937,449, filed on Nov. 19, 2019.

(51) Int. Cl.
| | |
|---|---|
| *G10L 13/02* | (2013.01) |
| *G10L 15/26* | (2006.01) |
| *G10L 25/78* | (2013.01) |
| *G06F 40/279* | (2020.01) |
| *G06F 40/58* | (2020.01) |
| *G10L 19/02* | (2013.01) |

(52) U.S. Cl.
CPC ............ *G10L 13/02* (2013.01); *G06F 40/279* (2020.01); *G06F 40/58* (2020.01); *G10L 15/26* (2013.01); *G10L 19/02* (2013.01); *G10L 25/78* (2013.01); *G10L 2025/783* (2013.01)

(58) Field of Classification Search
CPC ......... G10L 13/02; G10L 19/02; G10L 15/26; G06F 40/279; G06F 40/58
See application file for complete search history.

(56) References Cited

U.S. PATENT DOCUMENTS

| | | | | |
|---|---|---|---|---|
| 5,860,064 | A | * | 1/1999 | Henton ................. G10L 13/033 704/260 |
| 6,308,156 | B1 | * | 10/2001 | Barry ...................... G10L 13/07 704/251 |

(Continued)

FOREIGN PATENT DOCUMENTS

| | | | |
|---|---|---|---|
| EP | 1 093 113 A2 | 4/2001 | |
| EP | 1093113 A2 | * 4/2001 | ......... G10L 19/0018 |

OTHER PUBLICATIONS

International Search Report issued in International Application No. PCT/US2020/061371 dated Mar. 2, 2020.

(Continued)

*Primary Examiner* — Anne L Thomas-Homescu
(74) *Attorney, Agent, or Firm* — Morgan, Lewis & Bockius LLP; Robert C. Bertin

(57) ABSTRACT

A system and method enable one to set a target duration of a desired synthesized utterance without removing or adding spoken content. Without changing the spoken text, the voice characteristics may be kept the same or substantially the same. Silence adjustment and interpolation may be used to alter the duration while preserving speech characteristics. Speech may be translated prior to a vocoder step, pursuant to which the translated speech is constrained by the original audio duration, while mimicking the speech characteristics of the original speech.

6 Claims, 3 Drawing Sheets

(56) References Cited

U.S. PATENT DOCUMENTS

| | | | | |
|---|---|---|---|---|
| 6,418,405 | B1* | 7/2002 | Satyamurti | G10L 15/04 704/206 |
| 6,622,121 | B1* | 9/2003 | Crepy | G10L 15/01 704/243 |
| 7,010,489 | B1* | 3/2006 | Lewis | G10L 13/10 704/258 |
| 7,065,490 | B1* | 6/2006 | Asano | G10L 13/033 318/568.12 |
| 8,050,911 | B2 | 11/2011 | Garudadri | |
| 8,170,878 | B2* | 5/2012 | Liu | G10L 13/08 704/260 |
| 9,916,295 | B1* | 3/2018 | Crawford | G06F 40/166 |
| 10,573,312 | B1* | 2/2020 | Thomson | G10L 15/26 |
| 2001/0027394 | A1* | 10/2001 | Theimer | G10L 15/26 704/257 |
| 2003/0061042 | A1* | 3/2003 | Garudadri | G10L 15/30 704/254 |
| 2003/0061048 | A1* | 3/2003 | Wu | G10L 13/08 704/260 |
| 2003/0144842 | A1* | 7/2003 | Addison | G10L 13/10 704/260 |
| 2003/0163316 | A1* | 8/2003 | Addison | G09B 19/04 704/260 |
| 2005/0267758 | A1* | 12/2005 | Shi | G10L 13/10 704/260 |
| 2008/0071529 | A1* | 3/2008 | Silverman | G10L 21/0364 704/220 |
| 2008/0319754 | A1* | 12/2008 | Nishiike | G10L 13/10 704/260 |
| 2008/0319755 | A1* | 12/2008 | Nishiike | G10L 13/08 704/267 |
| 2009/0254345 | A1* | 10/2009 | Fleizach | G10L 13/00 704/260 |
| 2010/0161327 | A1* | 6/2010 | Chandra | G10L 17/02 704/235 |
| 2010/0191533 | A1* | 7/2010 | Toiyama | G10L 13/08 704/260 |
| 2011/0060590 | A1* | 3/2011 | Katae | G11B 27/10 704/260 |
| 2011/0165912 | A1* | 7/2011 | Wang | G10L 13/033 455/563 |
| 2011/0238420 | A1* | 9/2011 | Hirabayashi | G10L 13/08 704/260 |
| 2014/0039895 | A1* | 2/2014 | Aravamudan | G06F 16/683 704/257 |
| 2014/0337370 | A1* | 11/2014 | Aravamudan | G06F 16/433 707/759 |
| 2018/0358052 | A1* | 12/2018 | Miller | G11B 27/036 |
| 2019/0362703 | A1* | 11/2019 | Ijima | G10L 13/02 |
| 2021/0366460 | A1* | 11/2021 | Perucci | G06N 3/08 |

OTHER PUBLICATIONS

Written Opinion issued in International Application No. PCT/US2020/061371 dated Mar. 2, 2020.

* cited by examiner

METHOD AND APPARATUS FOR FORCED DURATION IN NEURAL SPEECH SYNTHESIS

FIELD OF THE INVENTION

The invention generally relates to text-to-speech conversion systems and, more particularly, to a text-to-speech system that constrains the duration of the speech.

BACKGROUND OF THE INVENTION

Current text-to-speech systems that are only based on a single artificial neural network model have no explicit duration control. The exact length of the created utterance can only be guessed, but not guaranteed exactly. In contrast, state-of-the-art systems that include a phoneme-duration model have a controllable total duration for the generated utterance. For end-to-end speech synthesis systems that include a separate text-to-feature model and a vocoder model, there is a need for post processing of the intermediate spectral features to enable the duration of target utterances to be controlled. There is a further need for the ability to match the speech characteristics of an audio interval after processing to constrain its duration in a shorter or longer audio segment. There is still a further need to be able to translate speech within audio and have the translated speech share similar speech characteristics with the original audio, even while its duration is constrained.

SUMMARY OF THE INVENTION

According to an embodiment of the present invention, a method enables one to set a target duration of a desired synthesized utterance without removing or adding spoken content. Without changing the spoken text, the voice characteristics may be kept the same or substantially the same. Silence adjustment and interpolation may be used to alter the duration while preserving speech characteristics. Speech may be translated prior to a vocoder step, pursuant to which the translated speech is constrained by the original audio duration according to an embodiment of the invention, while mimicking the speech characteristics of the original speech.

A system for constraining the duration of audio associated with text in a text-to-speech system, comprises an ASR system, a feature model, a duration constraint processor and a vocoder. The ASR system produces a stream of text and a time duration associated with the stream as part of an end-to-end system. The feature model receives a text stream and produces spectral feature output in frames associated with the text. The duration constraint processor is configured to receive the spectral feature output and the duration associated with the text stream and processes it to i) determine frames representing silence or an absence of text; ii) determine whether the stream is longer or shorter than the desired duration; iii) remove silence frames when required to reduce the duration of the feature output; iv) add silence frames when required to increase the duration of the feature output; and v) perform interpolation on the feature output after adjusting silence frames to make the duration of the feature output match the required duration. The vocoder is configured to receive the updated feature output frames and produce synthesized audio. The system may further include a machine translation system that translates the text from the ASR system prior to the feature model. In this manner, translated text may be turned in to speech having the same duration as the original speech, and may share its speech characteristics.

According to an embodiment of the present invention, a method for constraining the duration of audio associated with text in a text-to-speech system, comprises:
 producing a stream of text and a time duration associated with portions of the stream from an ASR system that is part of an end-to-end system;
 receiving the text stream at a feature model;
 generating a stream of spectral feature output in frames associated with the text;
 determining frames representing silence or an absence of text;
 determining whether the stream of spectral feature output is longer or shorter than the time duration associated with the text;
 removing silence frames when required to reduce the duration of the feature output;
 adding silence frames when required to increase the duration of the feature output;
 performing interpolation on the feature output after adjusting silence frames to make the duration of the feature output match the required duration; and
 synthesizing audio from the feature output.

BRIEF DESCRIPTION OF THE FIGURES

The above described features and advantages of the present invention will be more fully appreciated with reference to the below described and appended Figures.

DETAILED DESCRIPTION

Figure 1:
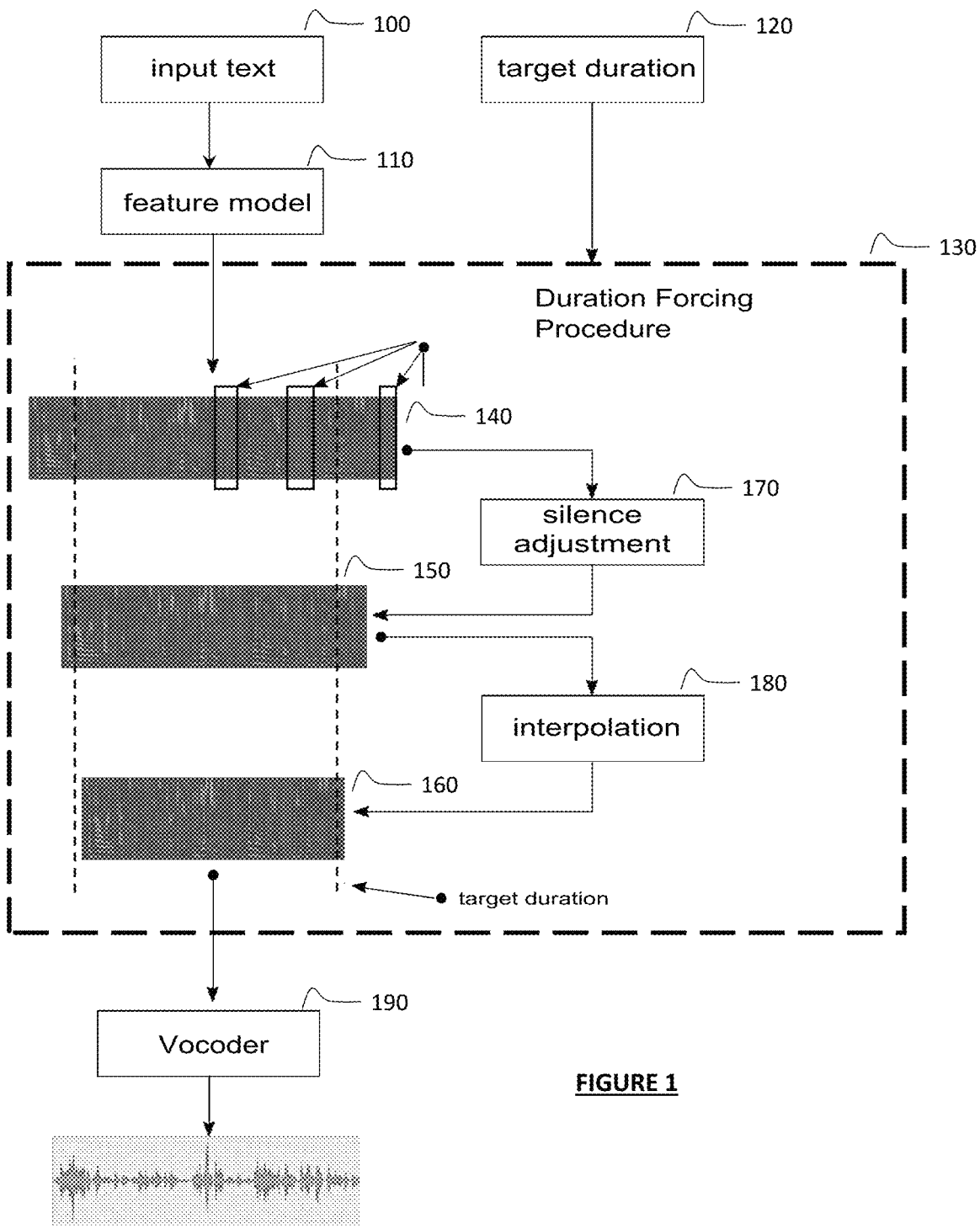
FIG. 1 depicts a functional block diagram of a system and method for processing input text to constrain it according to an embodiment of the present invention.

According to an embodiment of the present invention, a system and method enable duration control for specific types of speech synthesis systems, such as neural speech synthesis systems. Systems that have intermediate spectral features are able to be enhanced by this method. Typically, those kinds of systems consist of two separate artificial neural network models: a feature model and a speech vocoder.

A first part, the feature model, may generally be a neural network that converts text or similar speech describing representations like phonemes into spectral audio features. These audio-features are based on short-time-fourier-transformation of the target audio signal. Possible variants include linear power spectrograms, mel-filtered power spectrograms or mel-frequency cepstral coefficients (MFCC). Other features, like a fundamental frequency or voicing information can be present, but are not required for the method to work. In typical feature models the characters or phonemes of the input are first encoded by any kind of convolutional, recurrent or self-attentive neural network to form encoder states. The result is a sequence of hidden representations. The second part of the network is typically a decoder that predicts one or more spectral features at a time, based on some part of the encoder. This can for example be achieved by using an attention mechanism on the encoder. As the decoder creates the target spectrograms in an autoregressive way, the end of the sequence may be determined by a separate mechanism, e.g. a predicted stop token. All spectral frames until the stop token are the feature representation for the target utterance. Although the stop token can be placed at any time during decoding, this might result in incomplete features (stopping too early) or extensive silence at the end (stopping to late).

The second part of the speech synthesis is the vocoder model. A vocoder is any kind of model or algorithm that takes audio features as input and creates a corresponding audio waveform. In this case all vocoder models that use spectral features can be applied. A common example for an algorithmic solution is the Griffin & Lim procedure, which combines inverse Fourier transformation with iterative phase reconstruction. Neural approaches for vocoding with spectral features are WaveNet, WaveRNN or LPCNet, which are based on convolutions and recurrent neural networks to predict sample by sample of a target audio wave-form. All these have in common, that the length of the target waveform is in direct relation to the duration of the input spectrogram features.

For end-to-end speech synthesis systems that include a separate text-to-feature model and a vocoder model, this issue can be solved by applying post-processing on the intermediate spectral features. Post-processing the intermediate spectral features with silence detection and image interpolation enables "forced-duration" control for target utterances. The aim of the proposed method is to guarantee the exact or a desired target duration for the desired synthesized utterance without removing or adding spoken content. The spoken text should not be changed, and the voice characteristics should be kept the same as much as possible. When the output waveform of the vocoder models is relative to the input spectrograms, it is sufficient to process the spectrograms in a way that they match the target duration. A typical duration of a single spectral feature window might be 10 milliseconds. For an input of 200 spectral frames, a vocoder will synthesize exactly 2 seconds of speech. This means that only by changing the number of spectral frames, any target duration with a precision of +/−5 milliseconds can be achieved.

The aim of the proposed method is to guarantee the exact target duration of the desired synthesized utterance without removing or adding spoken content. The spoken text should not be changed, and the voice characteristics should be kept the same as much as possible. When the output waveform of the vocoder models is relative to the input spectrograms, it is sufficient to process the spectrograms in a way that they match the target duration. A typical duration of a single spectral feature window might be 10 milliseconds. For an input of 200 spectral frames, a vocoder will synthesize exactly 2 seconds of speech. This means that only by changing the number of spectral frames, any target duration with a precision of +/−5 milliseconds can be achieved.

Step 1: Silence Adjustment

Adding or removing silence of a spoken utterance does not change the content of a spoken utterance. Also, voice characteristics may be kept the same or substantially similar. Each frame of the spectrogram generated by the feature decoder is marked as silence or non-silence depending on a threshold. The marking can be achieved with but is not limited to the following methods or combinations of the following methods:

a) taking the mean of the spectral power and marking all frames that have a mean power below a certain threshold;

b) using a sliding average of the spectral power means, and marking frames where the sliding average is below a certain threshold; and c) using a speech recognition model that can detect word boundaries and silence between the words.

In some cases, it is important that the silence marking form consecutive groups of silence, and that these groups contain at least a certain amount of silence, e.g. 10 frames/ 100 milliseconds. For a given target duration and a given spectrogram length, the ratio determines how much relative silence is removed or added. For each of the detected silence frame groups, frames are removed or added. If the target duration is shorter, a specific number of frames is removed for each silence frame group until the target duration is reached or no silence is left. If the target duration is longer, silence frames are duplicated or additional silence frames added, until the target duration is achieved.

Some illustrative examples follow.

Example 1: The feature model generates features with a length of 540 frames and the target duration is 5 seconds. A total of 40 frames should be removed. If less silence frames are detected, all of them are deleted. If more silence frames are detected, e.g. three regions with 20, 10 and 30 silence frames, only a total of 40 frames are removed. As this is 2 of the number of silence frames, 2 from each group can be removed—13 from the first, 7 from the second and 20 from the third, being a total of 40.

Example 2: The feature model generates features with a length of 460 frames, with the same silence groups as in the previous example. Now for each silence region, 2 of the frames are duplicated.

Step 2: Spectral Interpolation lithe target duration could be achieved by removing frames marked as silence or adding additional frames without creating unnatural pauses, the target utterance duration is achieved correctly. If this was not possible (e.g. not enough frames with silence), the second step is applied. In the second step, the spectral features are interpreted as a one-channel image. By using an image representation, the spectral feature "image" can be resized with existing algorithms for image scaling. The scaling is only applied on the time axis, as the dimension of the feature frames has to be kept the same. All kinds of scaling techniques, such as nearest neighbor, bilinear interpolation or cubic splines can be used. As the spectral feature image can be resized into any arbitrary shape, the desired target duration can be guaranteed. If the target duration does not have to be achieved exactly, but just optimized towards the goal, a limiting resize ratio can be used to manage the trade-off between optimizing the duration towards the target and keeping the speech quality.

Example Implementations

The proposed method can be used in combination with an attention-based feature generation model and a recurrent neural vocoder. The feature generation model generates 80-dimensional melscale spectrogram features, representing 50 ms wide frames with a 12.5 ms shift. The power is given in the decibel scale, limited from 0 dB to −100 dB, with the mean speech power being −24 dB. The architecture of the feature model is based on an encoder-decoder attention model. The encoder consists of convolutional and recurrent layers over character-based input. The decoder is a LSTM based recurrent network, that uses an attention mechanism over the encoder states as input. The duration of the spectral sequence is defined by an additional stop token as network output.

The silence normalization is performed on the mean of the output spectrograms, with a sliding window of 3 frames. If the average activation of the window is below −60 dB, the window position marks the beginning of silence. All frames are marked as silence until the activation is higher than −60 dB again. If less than 5 frames were detected, the group of silence frames is discarded. If the target duration is shorter that the spectrogram length, from each group an equal (relative) number of frames is removed beginning from the middle frame of each group. If the target duration is longer, a number of silence frames is duplicated until the target duration is reached, or no frames are left for duplication. This means the silence frames can either be removed completely, or extended to twice the length.

The image resizing of the spectral features may be computed by using cubic spline interpolation, for which public algorithms are available. The target image size can be set to the exact number of required frames. The resulting spectrogram image may then be used as an input to a recurrent network-based vocoder, to produce the target utterance with the desired duration. The recurrent decoder has linear upsampling layers that distribute the spectral features along the sample axis. For a 12.5 ms shift and a target sample rate of 16 kHz, each spectral feature is upsampled to cover 200 positions. A recurrent layer uses this sequence as input to predict a distinct amplitude level for each sample position. The finished sample sequences are then encoded in a common audio file format which contains the synthesized speech with the desired target duration.

Figure 3:
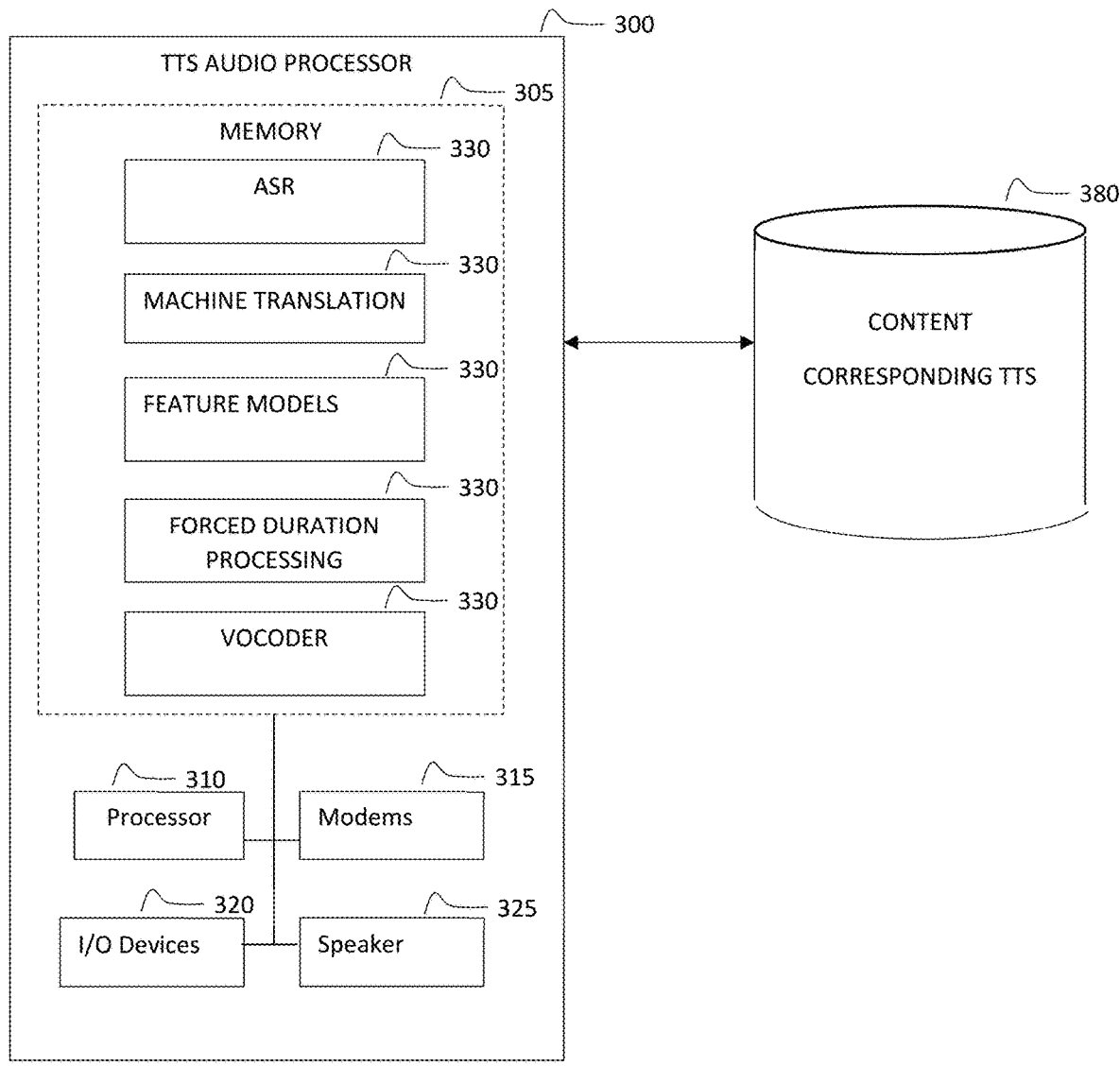
FIG. 3 depicts a system for processing input audio and facilitating output in the same language or a different language, with similar speech characteristics and a desired duration as compared to the speech in the original audio.

A schematic drawing of the process of forcing or constraining a duration of text in an end-to-end system is shown in FIG. 1. It will be understood that the process can be implemented in software or hardware. According to one embodiment of the invention, software for performing the processes described herein may be performed by an application program stored in the memory of a general purpose computer that includes a processor coupled to the memory, and input/output devices including a keyboard, display, mouse, a microphone, speakers etc., as shown in FIG. 3. The general purposes computer may also be operatively coupled to other computers via the Internet using one or more modems and may retrieve content from a database and store TTS information associated with the content in a database. The application programs include computer program instructions that may implement the ASR, Feature Models, Duration Constraints, Vocoder and other processes and process steps described herein. The computer program instructions or computer program logic may be stored in the memory and executed by the processor to produce the constrained duration speech or audio signals.

Referring to FIG. 1, a feature model 110 converts a target stream of text or phoneme input 100 into spectral features. A duration is associated with a word or string of text or string of phonemes which is provided by the ASR system. The duration information 120 is correlated with the text or phonemes and is available to the other processes including the duration constraint processes 130 described herein. After the text or phonemes have been processed by the feature model, for the spectral sequence 140, silence areas are detected, and shortened/expanded to match the target duration window, according to the silence adjustment 170. If the window could not be fitted exactly, an interpolation algorithm 180 is used to distort the spectral features 150 on the time axis to match the target duration. The adapted spectral features 160 are passed to a vocoder 190, which synthesizes the audio waveform containing the speech. In this manner, a series of frames of spectral data may first be expanded or shrunk in time by deleting or inserting silence frames as described. Subsequently, the spectral frames associated with a sequence of text or phonemes is measured in time as compared to a constrained duration associated with the text or phonemes from the ASR system or another source. The duration constraint process then performs an interpolation step as described herein to stretch or contract in time the spectral features. Thereafter it may be applied as an input to the vocoder in order to produce audio that may be exactly or substantially constrained to closely match the duration required, while preserving the audio quality.

Figure 2:
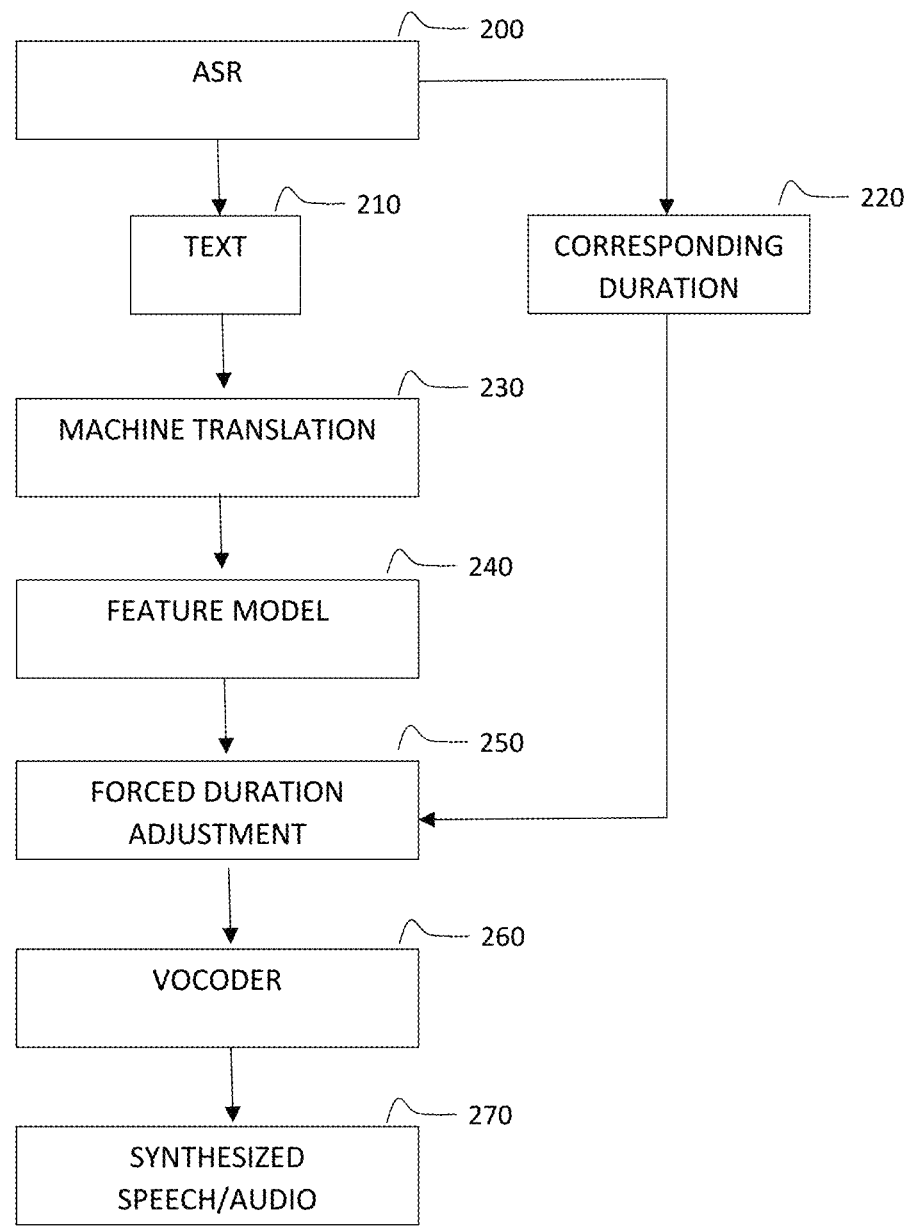
FIG. 2 depicts a method for processing input speech to translate it and constrain it according to an embodiment of the present invention.

FIG. 2 depicts an alternative embodiment of the invention in which an additional step of applying machine translation to text or phonemes is undertaken prior to the duration processing step. In this manner, text can be translated into another language, followed by generating audio features and an intermediate processing step of constraining the duration of the audio features prior to the vocoder. In this manner, content including video content may be analyzed by an ASR process, text extracted, the language translated, and then the text in a new language converted back to audio matching in time the audio associated with the original content. Referring to FIG. 2, in 200, an ASR system receives audio and processes it into text 210 and a corresponding duration 280. In 230, machine translation is performed on the text. In 240, a feature model is applied to the translated text. In 250, a forced duration adjustment is performed as shown in FIG. 1 and described herein and the duration is constrained based on the corresponding duration 280. In 260, a vocoder converts the features constrained in duration into audio, which is output as synthesized speech audio.

FIG. 3 depicts TTS audio processor system that is configured to processes and/or translate and constrain speech found in audio or audio visual materials. Referring to FIG. 3, the TTS processor system includes a TTS processor 300 coupled to a memory 305, a processor 310, modems 315, I/O devices 320, such as a keyboard, microphone, display, mouse and other i/o devices, and a speaker 325. The memory includes program instructions that when executed by the processor 310 cause the TTS processor 300 to process speech containing audio and constrain the speech duration and translated speech duration as described herein. The memory may include an ASR program 330, a machine translation program 240, feature models 250, forced duration processing programs 360 and a vocoder program 370. The processor executes the program instructions of the programs in order to implement the methods shown and described herein, and permit the inputting and outputting of data via the modems, I/O devices and speaker shown and described herein.

While particular embodiments of the invention have been shown and described herein, one of ordinary sill in the art will appreciate that changes may be made to those embodiments without departing from the spirit and scope of the invention.

What is claimed is:
1. A system for constraining the duration of audio associated with text in a text-to-speech system, comprising:
ASR system producing a stream of text, and a time duration associated with the stream, as part of an end-to-end system;
a feature model configured to:
receive a text stream; and produce a spectral feature output in frames associated with the text;
a duration constraint processor configured to:
receive the spectral feature output and the duration associated with the text stream; and
process the spectral feature output and the duration associated with the text stream to:
determine frames representing silence or an absence of text;
determine whether the stream is longer or shorter than the desired duration;
remove silence frames when required to reduce the duration of the spectral feature output;
add silence frames when required to increase the duration of the spectral feature output; and
perform interpolation on the spectral feature output after adjusting silence frames to make the duration of the spectral feature output match the required duration; and
a vocoder configured to:
receive the updated spectral feature output frames; and
produce synthesized audio.

2. The system of claim 1, further comprising:
a machine translation engine, coupled to the ASR system and the feature model, configured to translate the text stream from the ASR system into a translated text stream,
wherein the feature model is further configured to:
receive the translated text stream, and
produce the spectral feature output corresponding to the translated text stream.

3. A method for constraining the duration of audio associated with text in a text-to-speech system, the method comprising:
producing a stream of text and a time duration associated with portions of the stream from an ASR system that is part of an end-to-end system;
receiving the text stream at a feature model;
generating a stream of spectral feature output in frames associated with the text;
determining frames representing silence or an absence of text;
determining whether the stream of spectral feature output is longer or shorter than the time duration associated with the text;
removing silence frames when required to reduce the duration of the spectral feature output;
adding silence frames when required to increase the duration of the spectral feature output;
performing interpolation on the spectral feature output after adjusting silence frames to make the duration of the spectral feature output match the required duration; and
synthesizing audio from the spectral feature output.

4. The method of claim 3, wherein:
the silence frames are determined in segments of at least five frames; and
when silence frames are removed from the stream, the silence frames are removed evenly from the center of the segments.

5. The method of claim 4, wherein, when silence frames are added to the stream, the silence frames are added evenly to the center of the segments.

6. The method of claim 3, further comprising translating the text stream into another language using machine translation prior to receiving the text stream by the feature model.

* * * * *